(12) United States Patent
Yamamoto et al.

(10) Patent No.: US 7,507,576 B2
(45) Date of Patent: Mar. 24, 2009

(54) METHOD OF MANUFACTURING PROBE CARRIER

(75) Inventors: Nobuko Yamamoto, Kanagawa (JP); Naoto Mihashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/624,980

(22) Filed: Jan. 19, 2007

(65) Prior Publication Data

US 2007/0117139 A1      May 24, 2007

Related U.S. Application Data

(62) Division of application No. 10/105,303, filed on Mar. 26, 2002, now abandoned.

(30) Foreign Application Priority Data

Mar. 28, 2001   (JP)   .............. 2001/093268

(51) Int. Cl.
  *C12M 1/34*   (2006.01)
  *G01N 33/00*   (2006.01)
  *G01N 31/22*   (2006.01)
  *C07H 21/04*   (2006.01)
  *B01L 3/00*   (2006.01)
  *B01L 11/00*   (2006.01)

(52) U.S. Cl. ............ 435/287.2; 436/94; 536/23.1; 422/58; 422/68.1; 422/99; 422/101

(58) Field of Classification Search ............ None
See application file for complete search history.

(56) References Cited

U.S. PATENT DOCUMENTS

| | | | |
|---|---|---|---|
| 4,786,137 A * | 11/1988 | Cornelison et al. | 385/112 |
| 4,983,195 A | 1/1991 | Nolan et al. | 65/409 |
| 5,424,186 A | 6/1995 | Fodor et al. | 435/6 |
| 6,037,186 A | 3/2000 | Stimpson | 436/518 |
| 6,110,426 A | 8/2000 | Shalon et al. | 422/68.1 |
| 6,140,135 A * | 10/2000 | Landegren et al. | 436/518 |
| 6,887,701 B2 * | 5/2005 | Anderson et al. | 435/287.1 |
| 2002/0147330 A1 | 10/2002 | Yamamoto et al. | 536/24.32 |

FOREIGN PATENT DOCUMENTS

| | | |
|---|---|---|
| DE | 40 29 433 A1 | 3/1992 |
| EP | 0 703 825 B1 | 4/1996 |
| EP | 0 895 082 A2 | 2/1999 |
| JP | 7-270378 | 10/1995 |
| WO | WO 95/35505 A1 | 12/1995 |
| WO | WO 00/53736 | 9/2000 |

OTHER PUBLICATIONS

Diagger Laboratory Equipment and Supplies, 1999, p. 331.

\* cited by examiner

*Primary Examiner*—Bradley L Sisson
(74) *Attorney, Agent, or Firm*—Fitzpatrick, Cella, Harper & Scinto

(57) ABSTRACT

A flat plate-shaped probe carrier for carrying probes such as single stranded DNAs, proteins, etc., which are reactive specifically with target substances comprises a plurality of ring bodies arranged substantially in parallel and the external space among the ring bodies is filled with a filler such that the openings of the ring bodies are oriented to the surface of the probe carrier. Each ring body has a region for fixing a probe adapted to be bonded specifically to a target substance on its inner wall. The probe carrier is produced by bundling a plurality of hollow tubular members in parallel, then filling the external space among the bundled hollow members with a filler, and cutting the bundle along a plane intersecting the axial direction of the tubular members. Probes are fixed to the fixing region before or after filling the external space.

9 Claims, 2 Drawing Sheets

METHOD OF MANUFACTURING PROBE CARRIER

This application is a division of application Ser. No. 10/105,303, filed Mar. 26, 2002, which is incorporated herein by reference in its entirety.

BACKGROUND OF THE INVENTION

1. Field of the Invention

This invention relates to a probe carrier carrying a probe rigidly secured thereto for detecting a target substance. The present invention also relates to a method of manufacturing such a probe carrier.

2. Related Background Art

When analyzing the base sequence of a gene DNA or conducting a gene diagnosis by analyzing a number of items simultaneously, probes of different types are needed to single out a DNA having a target base sequence in order to raise the reliability of operation. DNA microchips have been attracting attention as means for providing probes of a number of different types to be used for such sorting operations. A large number of solution species (e.g., 96, 384 or 1,536 species) containing proteins or drugs to be sorted normally have to be subjected to a screening operation in an orderly manner in the field of high throughput screening of chemicals or combinatorial chemistry. For these purposes, techniques of sequentially arranging a large number of different types of drugs, automatic screening technologies and dedicated devices for sorting the drugs arranged in this way and software for controlling a number of screening operations and statistically processing the obtained results have been and are being developed.

Basically, such screening operations as described above that are conducted in parallel simultaneously consist of detecting an action or non-action or a response or non-response of each specimen to the known probes arranged in array, or probe array, provided as means for sorting the substances of specimens for evaluation under the same conditions. Generally, the action or response to be used with each probe is defined in advance and therefore substances of the same type are normally used as probe species that are mounted on a probe array. Then, the probe array may be that of DNA probes carrying a group of DNAs having different respective base sequences. DNAs, proteins and synthesized chemicals (drugs) are examples of substances that may be used for a group of probes. While a probe array of a group of a plurality of probe species is used in many instances, a large number of identical DNAs having the same base sequence, identical proteins having the same amino acid sequence or identical chemical substances may be arranged in an array. Such probes are mainly used for screening drugs. If the target substance is a nucleic acid, the probes may be formed by using a single stranded nucleic acid that shows a complementary sequence relative to all or a part of the target nucleic acid and is adapted to a specific hybridization with the base sequence of the target nucleic acid.

In a probe array formed by a plurality of probe species, a group of DNAs having different base sequences, a group of proteins having different amino acid sequences, a group of different chemical substances or the like are often arranged in an array on a substrate according to a predetermined sequence of arrangement. Particularly, DNA probe arrays are used for analyzing the base sequence of a gene DNA or conducting a gene diagnosis by analyzing a number of items simultaneously in order to raise the reliability of operation as pointed out above.

U.S. Pat. No. 5,424,186 describes a technique of preparing an array of DNA probes with DNAs having respective base sequences that are different from each other by means of a stepwise elongation reaction conducted on a carrier by utilizing photodecomposable protective groups and photolithography. With the proposed technique, it is possible to prepare a DNA probe array carrying DNAs of more than 10,000 different kinds that are different from each other in terms of a base sequence per 1 $cm^2$. The process of synthesizing a DNA by means of a stepwise elongation reaction, using this technique, comprises a photolithography step in which dedicated photomasks are used respectively for the four different kinds of bases (A, T, C, G) in order to selectively elongate any of the bases at a predetermined position of the array so that consequently DNAs of different species having desired respective base sequences are synthetically produced and arranged on a substrate in a predetermined order.

Besides the above-described technique, techniques of manufacturing a probe array by synthesizing DNAs for probes in advance in a refined manner, confirming, if necessary, their respective base lengths and supplying the DNAs to a substrate by means of an appropriate device such as a microdispenser are known. PCT Patent Publication WO 95/35505 describes a technique of supplying DNAs onto a membrane by means of capillaries. With this technique, it is theoretically possible to manufacture about 1,000 DNA arrays per 1 $cm^2$. It is basically a technique of manufacturing a probe array by supplying a probe solution to a predetermined position of a substrate for each probe by means of a capillary-shaped dispensing device and repeating this operation.

There are also known techniques of supplying a solution of a substance necessary for conducting an operation of DNA solid phase synthesis on a substrate in each elongation step. For example, European Patent Publication EP 0703825B1 describes a technique of synthesizing DNAs of a plurality of different species having respective predetermined base sequences in a solid phase by supplying nucleotide monomers and activators by means of respective piezo jet nozzles for the purpose of solid phase synthesis of DNAs. This supply (application) technique utilizing an ink-jet method is reliable in terms of reproducibility of the supply rate if compared with a solution supply (application) technique utilizing capillaries and also provides advantages for realizing high density probe arrays because the nozzle structure of the ink-jet system can be miniaturized.

Patent Publication EP 895082 discloses a technique of causing a liquid containing a probe to adhere to a solid phase as liquid droplets by means of a bubble jet head and forming a spot containing a probe on the solid phase. Patent Publication WO 00/53736 discloses a method of manufacturing arrays by immobilizing a nucleic acid in a hollow thread.

Thus, it is the object of the present invention to provide a probe carrier that is adapted to mass production and a method of manufacturing such a probe carrier.

SUMMARY OF THE INVENTION

In an aspect of the invention, there is provided a flat plate-shaped probe carrier comprising a plurality of ring bodies having in the inside a region for fixing a probe adapted to be bonded specifically to a target substance and a filler filled among the ring bodies without any substantial space left therein.

In another aspect of the invention, there is provided a method of manufacturing a probe carrier comprising a plurality of ring bodies having in the inside a region for fixing a probe adapted to be bonded specifically to a target substance, the method comprising:

a step of bundling a plurality of hollow tubular members to make them arranged substantially in parallel with each other;

a step of filling the external space among the bundled hollow tubular members with a filler and solidifying the filler;

a step of cutting the bundle of the tubular members filled with the filler along a plane intersecting the axial direction of the tubular members to produce a flat plate-shaped carrier comprising a plurality of ring bodies having respective internal openings; and a step of fixing probes to the respective regions for fixing a probe before or after filling the space with the filler.

DESCRIPTION OF THE PREFERRED EMBODIMENTS

Figure 1A:
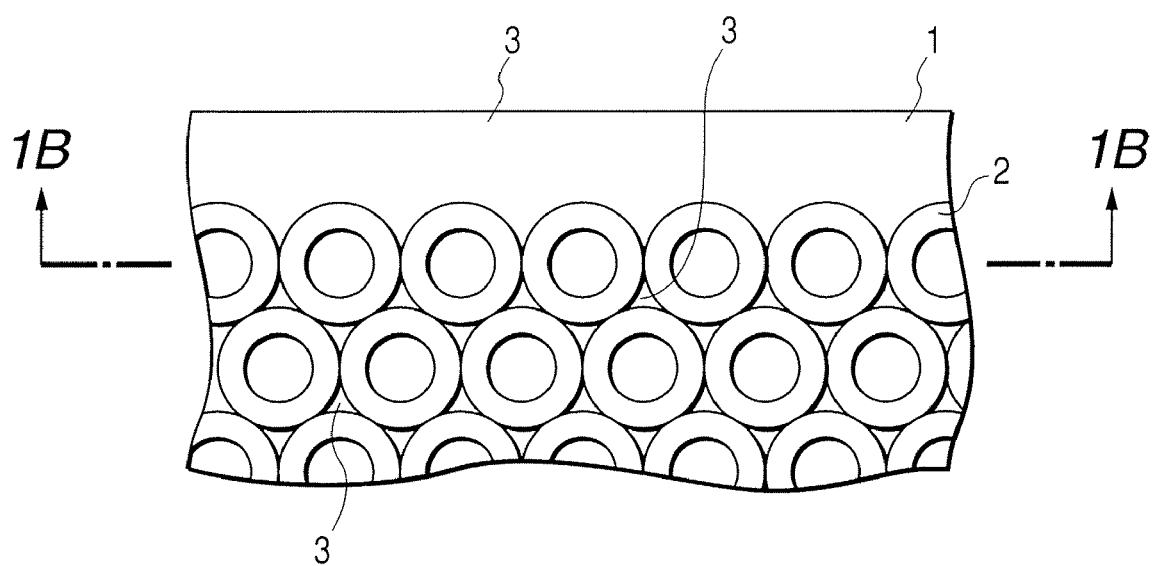
FIGS. 1A and 1B are schematic illustrations of a probe carrier according to the invention.
Figure 1B:
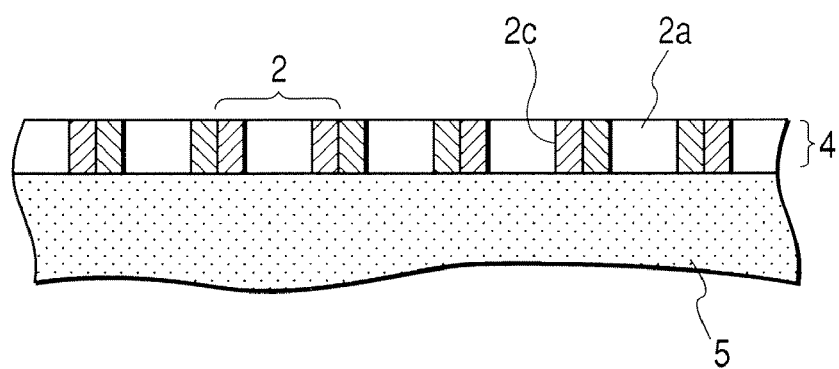

Each region for fixing a probe in a probe carrier according to the invention is formed on the inner wall of the opening section of a ring body. FIGS. 1A and 1B schematically illustrate a probe carrier according to the invention having such a configuration. FIG. 1A is a schematic plan view of the probe carrier, showing the surface thereof having opening sections 2a of the ring bodies 2. FIG. 1B is a schematic cross-sectional view of the probe carrier taken along line 1B-1B in FIG. 1A.

Referring to FIGS. 1A and 1B, the probe carrier 1 has a planar surface where the openings of the opening sections 2a of the ring bodies 2 are arranged. A probe is fixed to the surface of the inner surface 2c of each opening section 2a. The region for fixing a probe of each ring body 2 is formed by the inner surface 2c of the opening section 2a.

The ring bodies 2 can be formed by using fiber, glass, resin or some other similar material.

From the viewpoint of efficiently producing a large number of ring bodies having probes fixed thereto, it is preferable to fix probes to the insides of respective tubular members, or hollow members, whose hollow areas are extending axially, and subsequently cut the tubular members in a direction intersecting the axial direction to obtain a large number of hollow pieces, or ring bodies, having a predetermined height. In the instance illustrated in FIGS. 1A and 1B, each ring body has a pair of opposite surfaces produced by truncation and running substantially in parallel with each other in a direction perpendicular to the axial direction of the hollow members. At least one of the opposite surfaces can be used for arranging a region for fixing a probe of the carrier. The operation of fixing a probe to the hollow area of each tubular member of the probe carrier may come before or after the operation of filling the outside space of the tubular members with a filler and solidifying it.

The external space of the ring bodies of the probe carrier is filled with a filler 3 to produce a layer 4 comprising the ring bodies as integral parts thereof. While the layer 4 is laid on a base member 5 supporting the former in the instance of FIGS. 1A and 1B, the base member 5 may be omitted if the layer 4 itself can provide a satisfactory mechanical strength.

For the purpose of the present invention, the expression of "without any substantial space left therein" refers to a state where the space is filled with the filler to such an extent that cleansing or specimen solutions and various reagents would not permeate after washing the ring carrier.

A probe carrier as shown in FIGS. 1A and 1B can be manufactured by a method as described below.

Firstly, the inside of each hollow member that may be a tubular member or a hollow thread is filled with a solution containing a probe and the probe is fixed to the inner wall of the hollow member.

The hollow member may be formed typically by extrusion molding of polypropylene film that is used for purification of water, artificial lung and artificial liver, polyethylene film or cupro-ammonia cellulose regenerated film.

The above fixing operation is conducted for each probe necessary for forming the probe carrier. If necessary, a reagent to be used for the purpose of fixation and/or a cleansing solution is supplied to the inside of the hollow member. Any known appropriate technique can be used for the fixing operation. For example, liquid containing the probe may be poured into the hollow area of the hollow member to make the inner wall of the hollow member and the probe contact and react with each other. The probe may be fixed to the inner wall of the hollow member by means of a chemical reaction utilizing any of various reaction groups and/or physical adsorption, which will be described hereinafter. The inside of the hollow member may be cleaned to provide a structure with a hollow portion and an inner wall to which the probe has been fixed.

The hollow member now carrying the probe fixed to the inner wall thereof is closed at an end. Then, a necessary number of similar hollow members are arranged in a container to be used for a centrifugal process in parallel with each other along the axial direction thereof and bundled with the ends made flush with each other. Note that the hollow members are arranged and bundled in such a way that, when they are cut to show opposite surfaces, the region of each hollow member where the probe is fixed is located at a predetermined position on the corresponding surface.

Figure 2A:
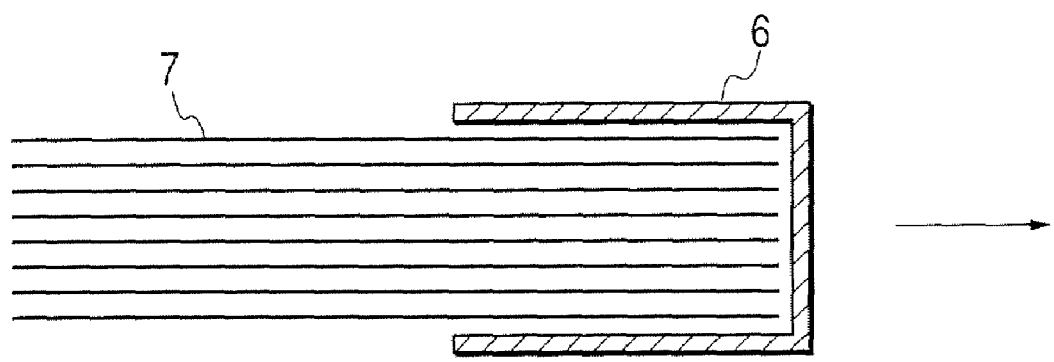
FIG. 2A is a schematic illustration of an apparatus for forming a region for fixing a probe in a hollow member.
Figure 2B:
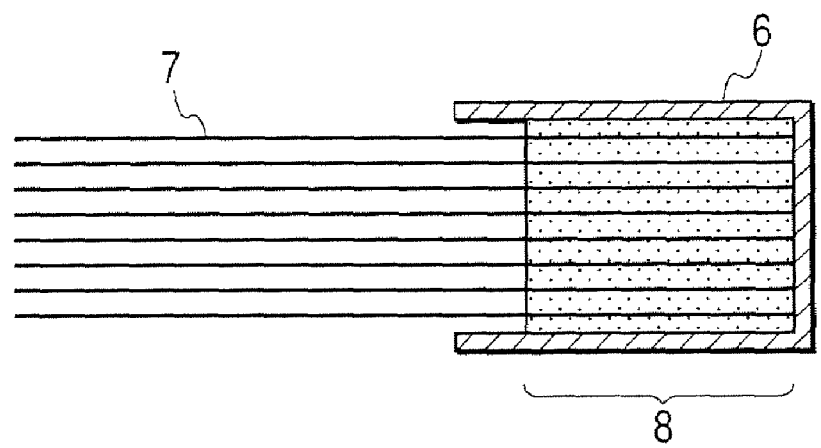
FIG. 2B is a schematic illustration of a region for fixing a probe.

FIG. 2A shows how the hollow members 7 are arranged in a container 6 that is to be used for a centrifugal process. Under this condition, the container 6 is made to turn along a circular track having a given radius of gyration with the central axis of the container 6 located on a radius of gyration in order to generate centrifugal force that is directed toward the end of the bundle of the hollow members in the direction of the arrow shown in FIG. 2A. A bonding material (potting material) that may typically be polyurethane is driven to move in the direction of the arrow and fill the external space of the hollow members 7 by the centrifugal force. As the application of the centrifugal force is suspended, the mobilized bonding material is solidified so that a fixed section 8 as shown in FIG. 2B is obtained. If the bonding material is in a gel state and is subjected to a centrifugal force, a shearing force is generated in the bonding material to make it have a thixotropic property and turn into a sol state. As a result, the filler is mobilized and driven to move into the external space of the tubular members.

The ends of the hollow members where the fixed section 8 is formed is preferably closed by (filled with) resin if the lateral wall separating the hollow and the external space of each hollow member shows gas permeability. If the lateral wall of each hollow member does not show gas permeability, it is preferable to close the end where the fixed section 8 is formed in order to reliably prevent the bonding material (filler) from flowing into the hollow of the hollow member.

The gyration of the container 6 is terminated when the solidification of the bonding material is completed. Then, the hollow members 7 are cut into a short piece at predetermined positions of the fixed section 8 along a plane perpendicularly, for example, intersecting the axial direction of the hollow members that are arranged in parallel with and rigidly secured to each other. The plane of arrangement of the hollow ring bodies 2 having respective openings is made to agree with one of the opposite surfaces of the short piece as shown in FIGS. 1A and 1B. In other words, the ring bodies 2 illustrated in FIGS. 1A and 1B are formed by truncating the hollow members 7 to show a predetermined height. A probe carrier having regions for fixing probes that are arranged in a predetermined manner is obtained from the short piece.

With the above-described method of manufacturing a probe carrier according to the invention, it is possible to manufacture a large number of probe carriers having a same and identical configuration by cutting a number of hollow members at a fixed section to produce short pieces. Additionally, the external space of the ring bodies is filled with a bonding material because, if the space is not filled and left as gaps, problems may arise as a specimen solution containing the target substrate and various reagents flow into the space.

According to the invention, the probes fixed to the probe carrier can be specifically bonded to a specific target substance. Additionally, the probes may contain oligonucleotide, polynucleotide and/or other polymers that can recognize a specific target. The term "probe" as used herein refers to a group of molecules that can operate as a probe such as polynucleotide molecules or molecules such as polynucleotide molecules that are fixed to distributed respective positions of a surface to show the same, identical arrangement and includes molecules called ligands. The probe and the target can often be exchangeable and also can be bonded or made to become bonded to each other as a part of ligand-antiligand (or receptor) pairs. For the purpose of the invention, a probe and a target can contain one or more than one natural base and/or analog.

Examples of a probe that can be supported on a carrier include a substance having a bonding section that is to be bonded to the carrier in a part of the oligonucleotide thereof showing a base arrangement that can be hybridized with a target nucleic acid. The bonding section to be bonded to the carrier will show a structure linked to the surface of the carrier. There are no limitations on the position of the bonding section to be bonded to the carrier in the oligonucleotide molecule so long as the desired hybridization reaction is not adversely affected.

While the probes to be carried by a probe carrier manufactured by a method according to the invention may be appropriately selected depending on the application thereof, they are preferably selected from DNAs, RNAs, cDNAs (complementary DNAs), PNAs, oligonucleotides, polynucleotides and other nucleic acids, oligopeptides, polypeptides, proteins, enzymes, substrates relative to enzymes, antibodies, epitopes relative to antibodies, antigens, hormones, hormone receptors, ligands, ligand receptors, oligosaccharides and polysaccharides for the purpose of advantageously embodying the method of the present invention. If necessary, two or more than two of the above-listed substances may be combined for use.

For the purpose of the invention, a probe carrier refers to an object realized by fixing a plurality of probe species in independent respective regions of the surface of the carrier (including the surface of the inner walls of hollow members or tubular carrier members) typically as dot-shaped spots, while a probe array is one where such respective regions are arranged at a predetermined interval.

On the other hand, each probe has a structure that makes it possible to be bonded to the surface of the carrier and preferably be bonded onto the carrier by way of the structure that makes it possible to be bonded to the surface thereof. Preferably, the structure of each probe that makes it possible to be bonded to the surface of the carrier is formed by means of a process of introducing an organic functional group such as an amino group, a mercapto group, a carboxyl group, a hydroxyl group, an acid halide (haloformyl group; —COX), a halide (—X), aziridine, a maleimide group, a succinimide group, isothiocyanate, a sulfonylchloride (—$SO_2Cl$) group, an aldehyde group (formyl group, —CHO), hydrazine or acetamide iodide. Whenever necessary, the surface of the carrier may be treated appropriately in a manner that depends on the structure necessary for bonding the probes to the carrier.

What is claimed is:

1. A method of manufacturing a probe carrier comprising a plurality of ring bodies, wherein the ring bodies have an internal surface, and the internal surface has a region for fixing a probe adapted to be bonded specifically to a target substance, said method comprising:
   a step of bundling a plurality of hollow tubular members to arrange them substantially in parallel with each other;
   a step of filling an external space among the bundled hollow tubular members with a filler and solidifying the filler;
   a step of cutting the bundle of the tubular members filled with the filler along a plane intersecting an axial direction of the tubular members to produce a flat plate-shaped carrier comprising a plurality of ring bodies having respective internal openings;
   a step of sealing the tubular members at one end before filling the space with the filler; and
   a step of fixing probes to respective regions for fixing a probe before or after filling the space with the filler,
   wherein the filler is in a gel state before the step of filling the external space, and the external space is filled with the filler by applying a centrifugal force to the filler making it flow in a sol state, and
   wherein solidification is completed as the application of the centrifugal force is reduced, but while gyration still takes place.

2. The method according to claim 1, wherein the target substance is a nucleic acid and the probe has a sequence complementary relative to part or all of the base sequence of the nucleic acid and is a single-stranded nucleic acid adapted to be specifically hybridized with the nucleic acid.

3. A method for forming a flat plate-shaped probe carrier comprising the steps of:
   providing a plurality of tubular members having an inner surface and an outer surface and being sealed at one end;
   filling an external space among the tubular members with a filler by applying a centrifugal force to the filler so that solidification of the filler is completed as the application of the centrifugal force is reduced, but while gyration still takes place;
   fixing a probe on the inner surface of the tubular members before or after filling the external space with the filler; and
   forming the flat plate-shaped probe carrier comprising ring bodies by cutting the tubular members.

4. The method according to claim 3, wherein the ring bodies comprise fiber, glass or resin.

5. The method according to claim 3, wherein the ring bodies comprise a polypropylene film, polyethylene film or cupro-ammonia cellulose regenerated film.

6. The method according to claim 3, wherein the filler comprises polyurethane.

7. The method according to claim 3, wherein the external space is filled so that substantially no said external space is left.

8. The method according to claim 3, wherein the flat plate-shaped probe carrier consists of the bundle of hollow tubes, probes and the filler.

9. The method according to claim 3, wherein the probe is a single-stranded nucleic acid.

* * * * *